United States Patent [19]

Keintzel et al.

[11] Patent Number: 5,038,856
[45] Date of Patent: Aug. 13, 1991

[54] ARRANGEMENT FOR THE PROTECTION OF TUBE SECTIONS OF PLATEN-LIKE HEAT-TRANSFER SURFACES DISPOSED IN A GAS CONDUIT AGAINST WEAR BY GASES LADEN WITH SOLID PARTICLES

[75] Inventors: Günter Keintzel, Engelskirchen; Ulrich Premel, Gummersbach, both of Fed. Rep. of Germany

[73] Assignee: L. & C. Steinmüller GmbH, Gummersbach, Fed. Rep. of Germany

[21] Appl. No.: 447,220

[22] Filed: Dec. 7, 1989

[30] Foreign Application Priority Data

Dec. 7, 1988 [DE] Fed. Rep. of Germany ....... 3841122

[51] Int. Cl.[5] ............................................. F28F 19/00
[52] U.S. Cl. ................................... 165/134.1; 165/920
[58] Field of Search ............................. 165/134.1, 920; 122/DIG. 13, 235 A, 235 C, 235 F

[56] References Cited

U.S. PATENT DOCUMENTS 2,853,279  9/1958  Switzer ............................ 165/134.1
3,287,090  11/1966  Loeffler, Jr. et al. ............ 165/134.1
3,472,315  10/1969  Stoker .............................. 165/134.1

FOREIGN PATENT DOCUMENTS 133849     1/1979   Fed. Rep. of Germany ... 165/134.1
1268927   11/1986   U.S.S.R. ............................ 165/134.1
2070224    9/1981   United Kingdom ............. 165/134.1

OTHER PUBLICATIONS

Braunkohle, Heft 3, Band 13, Mar. 1961 entitled "Feuerungstechnik und Wärmewirtschaft/Verschleissprobleme bei Staubkesseln", pp. 81–94.

Primary Examiner—John Rivell
Assistant Examiner—L. R. Leo
Attorney, Agent, or Firm—Robert W. Becker & Associates

[57] ABSTRACT

An arrangement for the protection of tube sections of platen-like heat-transfer surfaces disposed in a gas conduit against wear by gases laden with solid particles. A wear-protection element can be withdrawn from the gas conduit, in the direction of the lengthwise direction thereof, without the need to first loosen a fixed connection to the tube sections that are to be protected. The wear-protection element can be in the form of a rotatable deflector that protects the rounded end portions of tubes, or can be in the form of a solid section that protects linear tube sections.

5 Claims, 3 Drawing Sheets

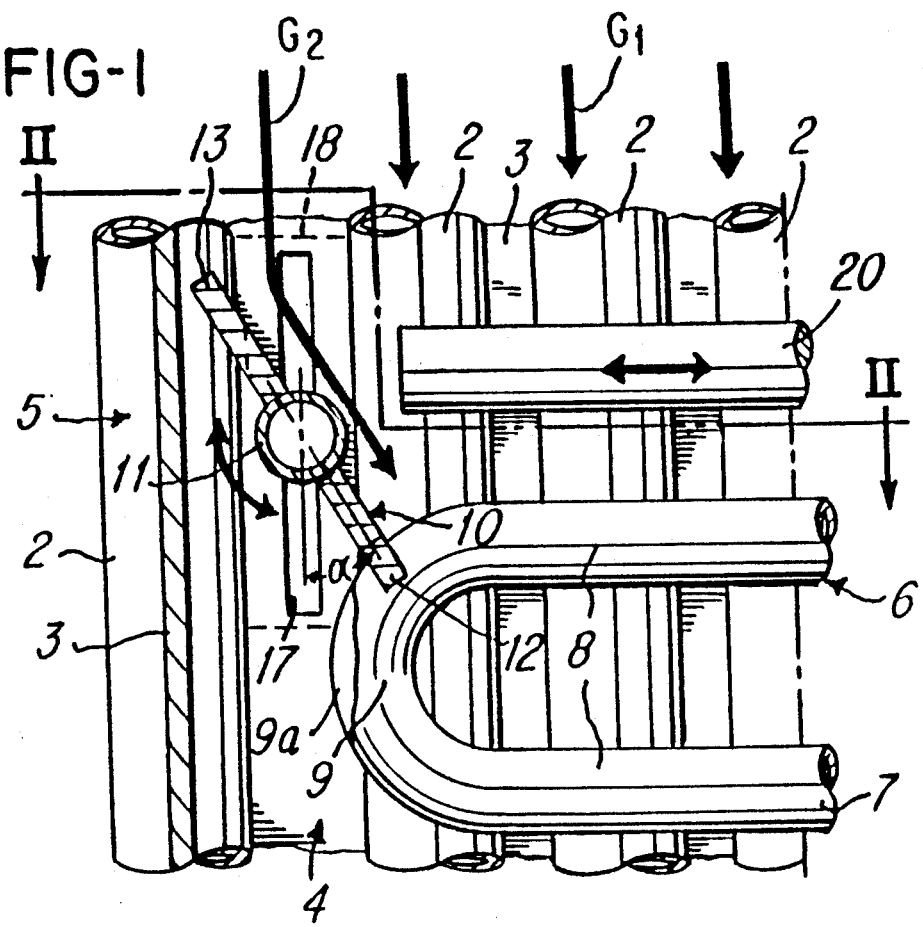
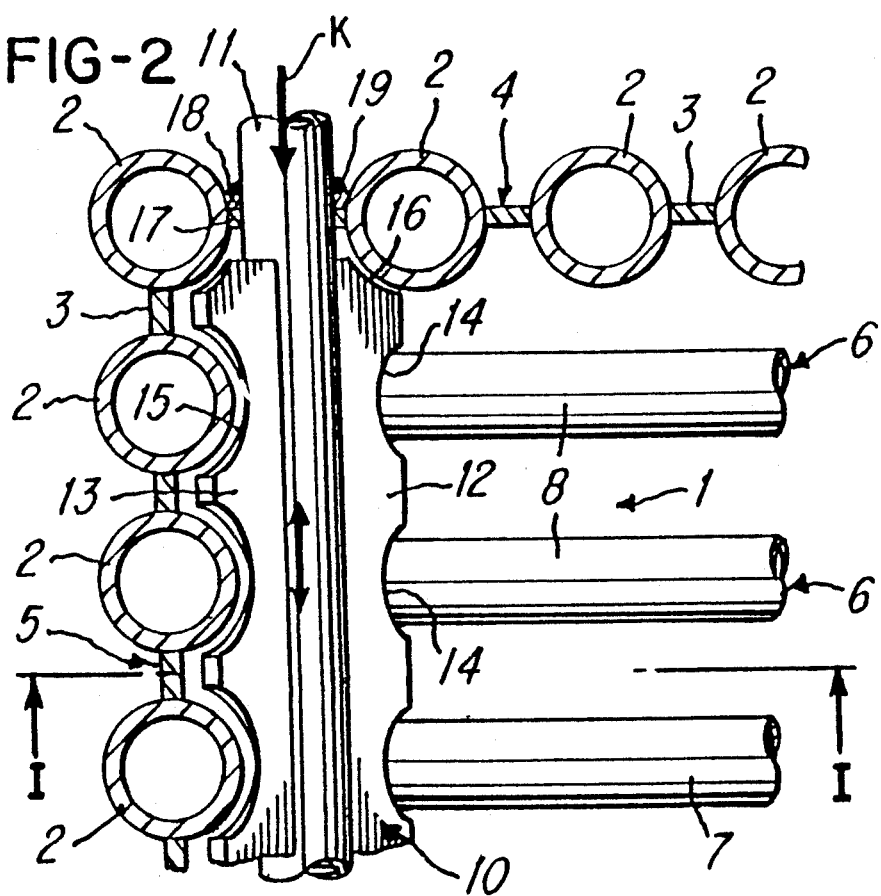

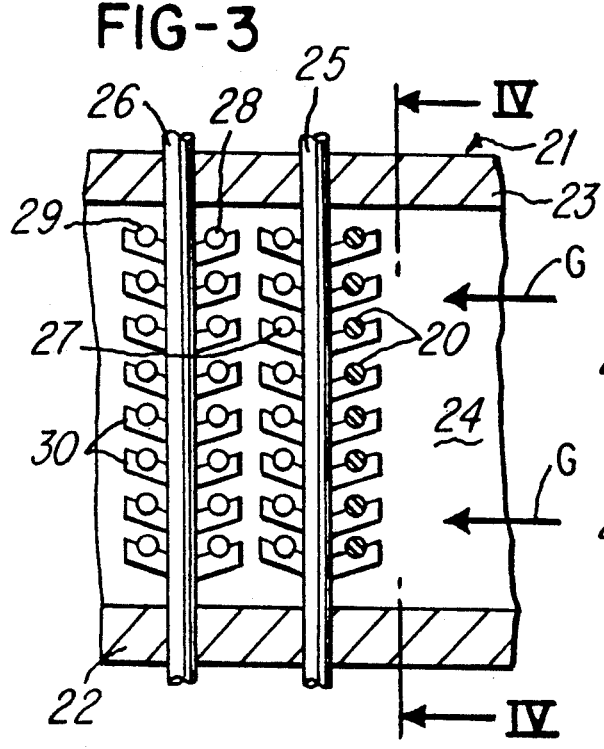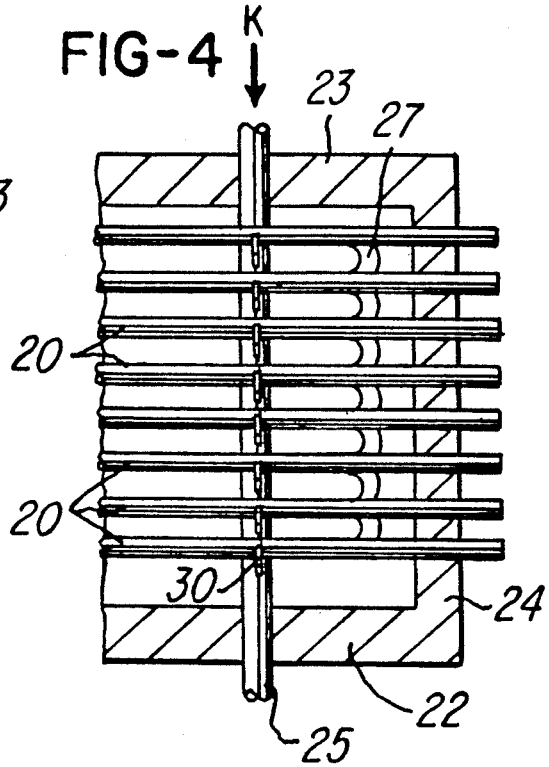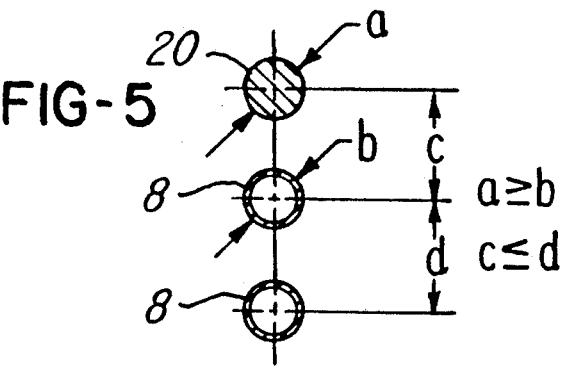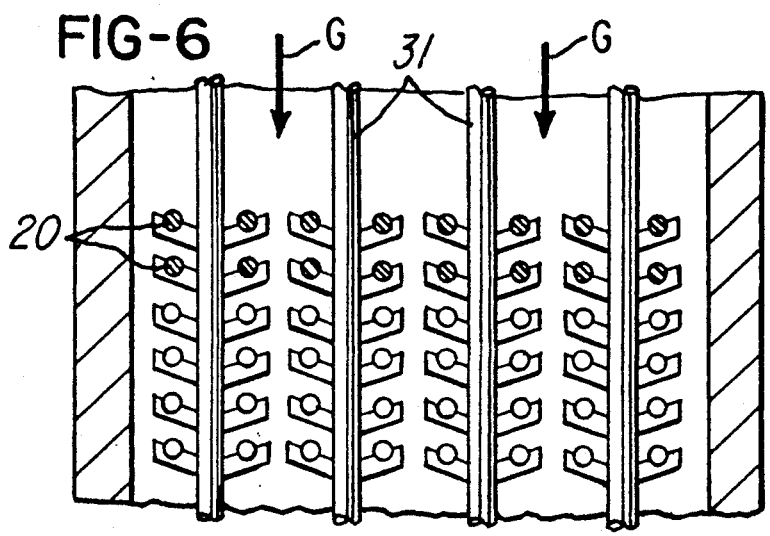

5,038,856

ARRANGEMENT FOR THE PROTECTION OF TUBE SECTIONS OF PLATEN-LIKE HEAT-TRANSFER SURFACES DISPOSED IN A GAS CONDUIT AGAINST WEAR BY GASES LADEN WITH SOLID PARTICLES

BACKGROUND OF THE INVENTION

The present invention relates to an arrangement for the protection of tube sections of platen-like heat-transfer surfaces disposed in a gas conduit against wear by gases laden with solid particles.

Arrangements for preventing damages due to wear to ancillary heat-transfer surfaces are known from the German Publication "Braunkohle", issued Mar. 3, 1961, the article entitled "Feuerungstechnik und Wärmewirtschaft/VerschleiβproblemebeiStaubkesseln" (Firing Technology and Heat Economy/Wear Problems in Dust Vessels), pages 81–94, especially pages 88, 89

Damage due to wear occurs, among other places, on the outer bends of bent tubes or meandering strips that are more or less closely adjacent to the conduit walls. The availability of surface to the dust-laden gases in these regions leads to an increased velocity at these locations due to the varying pressure loss over the entire heat-transfer surface over which the gas flows. This leads to greater wear, since the velocity occurs to the third or fourth power in the wear rate, whereas the dust loading occurs only linearly. The deflectors disclosed in FIG. 14 on page 89 of the aforementioned article not only directly protect the bends of the tubes, but also provide a further protection in that they deflect the solid particles onto the masonry of the conduit wall.

The deflectors are preferably secured to the tubes.

As shown in the lower half of the aforementioned FIG. 14, elongated tubular portions of the heat-transfer surfaces are protected by angle irons, flat bars, and tubular half shells that are secured to the linear tubular portions themselves.

Not only with those deflectors that extend parallel to the conduit wall and are associated with the outer rounded end portions, but also with regard to the profiled strips that protect the individual tubes, in order to replace such protective devices the connection to the tubular portion in the conduit that is to be protected must be loosened, and after a new wear-protection element has been provided this connection must be reestablished.

It is therefore an object of the present invention to provide an arrangement of the aforementioned general type that facilitates the replacement of the wear-protection elements.

BRIEF DESCRIPTION OF THE DRAWINGS

This object, and other objects and advantages of the present invention, will appear more clearly from the following specification in conjunction with the accompanying schematic drawings, in which:

FIG. 1 is a partial cross-sectional view, along the line I—I in FIG. 2, through a gas conduit having a rounded end portion of a bent heat-transfer surface, a deflector, and a wear-protection element for protecting linear tube section from wear;

FIG. 2 is a cross-sectional view taken along the line II—II in FIG. 1;

FIG. 3 is a partial cross-sectional view through a further gas conduit to illustrate the arrangement of solid section wear-protection elements relative to the tubular portions of a platen-like heat-transfer surface;

FIG. 4 is a cross-sectional view taken along the line IV—IV in FIG. 3, showing wear-protection elements extending out of the conduit wall;

FIG. 5 diagrammatically illustrates the dimensional and spacing conditions;

FIG. 6 is a cross-sectional view through a further gas conduit having vertical ga flow in contrast to the horizontal gas flow of the embodiment of FIG. 3;

SUMMARY OF THE INVENTION

Figure 7:
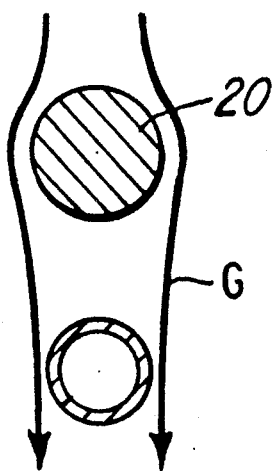
FIGS. 7–9 show the relationship of solid section wear-protection elements of varying cross-sectional configurations to a tube section that is to be protected.

The arrangement of the present invention is characterized primarily by wear-protection element means disposed in the gas conduit in such a way that it can be withdrawn therefrom, in the direction of lengthwise dimension thereof, without the need to first loosen a fixed connection to the tube sections that are to be protected, since no such connection is present.

In this way, a wear-protection element that no longer provides adequate protection against wear can be easily replaced.

To protect rounded end portions of a meandering heat-transfer surface, where the rounded end portions are adjacent to a conduit wall that is formed of tubes, and in particular is of tube-fin-tube construction, pursuant to the present invention the wear-protection element can be in the form of a deflector that extends parallel to the gas conduit wall and that deflects the gas flow in the region of the rounded end portions, with the deflector comprising an elongated carrier that extends parallel to a first conduit wall of tubes and that is provided with fins that are disposed essentially diametrically across from one another and are preferably welded on; a second one of the conduit walls is provided with a slot for the introduction and removal of the deflector into and from the gas conduit, with the elongated carrier of the deflector being disposed in the gas conduit in such a way that the deflector is pivotable into an operating position for deflecting the flow of gas away from the rounded end portions and onto less weak portions of the tubular heat-transfer surfaces, i.e. onto the end regions of the rounded ubular portions or onto linear tube sections, whereby preferably an impact or rebound angle of close to 90° is achieved. The essential point is that the more greatly endangered base of the bends is stressed less or even not at all by the dust.

The carrier is preferably embodied as a cooled tube, since at higher gas temperatures the mechanical strength is no longer provided, and since frequently gases that are laden with solid material also contain corrosive components; for example, without providing a cooling effect the high-temperature corrosion of these tubes is relatively high, for example $H_2S$ corrosion.

It is possible to provide the fins with linear, free edges; however, in order to eliminate a surface availability to the greatest extent possible, it is advantageous if the free edges of the fins are provided with recesses that extend over the tubes of the platen-like heat-transfer surfaces or the wall heat-transfer surfaces that are to be protected.

In an arrangement to protect elongated or linear tube sections of platen-like heat-transfer surfaces disposed in the gas conduit, with the wear-protection element extending parallel to the tube sections and being disposed so as to cover the tube section upstream thereof as viewed in the direction of flow of the gas, it is proposed that at least one wear-protection element be spaced from the tube section that is to be protected and be disposed in such a way that it is not fixedly connected to the tube section. The distance of the wear-protection element from the tube section that is to be protected should be less than or equal to the spacing between tubes of the heat-transfer surface.

In a direction transverse to the direction of gas flow, the dimension of the wear-protection element should be equal to or greater than the diameter of the tubes that are to be protected.

The wear-protection element is preferably embodied as a solid section, so that after a certain amount of wear has occurred, the wear-protection element can be turned from the outside and can further carry out its wear-protection function before it has to be withdrawn (with withdrawal taking place in the direction of the lengthwise direction thereof) and has to be replaced.

It is expedient for the wear-protection element to have a circular, triangular, or square cross-sectional configuration. The advantages of the various cross-sectional configurations, as well as other specific features of the present invention, will be described in detail subsequently.

DESCRIPTION OF PREFERRED EMBODIMENTS

Referring now to the drawings in detail, FIG. 1 illustrates a gas conduit 1 through which a dust-laden gas G flows. The gas conduit 1 is provided with conduit walls of tube 2—fin 3—tube 2 construction; FIGS. 1 and 2 show two such conduit walls 4 and 5 that form a conduit corner.

Disposed in the gas conduit 1 are heat-transfer surfaces 6 that are formed from spiral or bent tubes 7. The bent tubes comprise linear tube sections 8 that are respectively interconnected by rounded end portions 9 that are spaced from the conduit wall 5. Since due to the surface availability or presence the velocity of the gas is increased, the rounded end portions 9 are subjected to a particularly high rate of wear.

In order to reduce this wear, a wear-protection deflector 10 extends parallel to the wall 5. This deflector 10 comprises a tube 11, which is cooled with a coolant K, and fins 12 and 13 that are welded diametrically thereon.

Formed in the free edges of the fins 12 and 13 are recesses 14 and 15 of half-moon shape that are matched to the position and geometry of the tubes 2 and 7. The corners of the fins 12 and 13 have a rounded-off configuration as indicated by the reference numeral 16.

Formed in the conduit wall 4 is a slot 17 that is matched to the cross-sectional configuration of the tube 11 and to the geometry of the fins 12 and 13. The wear-protection deflector 10 can be inserted through the slot 17 between two tubes of the conduit wall; during such insertion, the fins 12 and 13 extend parallel to the conduit wall 5. After the wear-protection deflector 10 has been introduced, the deflector is pivoted out of a vertical position by an angle $a$, so that the recesses 14 and 15 extend over the bent tubes 7 and the tubes 2 of the wall 5.

In this angular position the partial stream $G_2$ of gas is deflected, and the dust particles that are received by the fins 12 and 13 are diverted from that region 9a of the bent tubes that are most endangered to less endangered regions in the vicinity of the linear tube sections 8. Those portions of the slot 17 that are associated with the fins 12 and 13 are covered from the outside by a cover plate 18, and the angular position is secured by a welding 19. The possibilities for movement provided for the deflector 10 are indicated in FIGS. 1 and 2 by double arrows.

On its bottom end as shown in FIG. 2, the wear-protection deflector 10 can be held via a tube section in a corresponding opening of the opposite wall, or a bearing bushing can be provided on the inner surface. The coolant K would then be introduced and withdrawn at one end.

In FIG. 1, the upper linear tube section 8 is protected by a wear-protection element 20 of circular cross-sectional configuration; the wear-protection element 20 extends parallel to the tube section 8 and can be inserted and withdrawn in the direction of the double arrow.

FIG. 5 shows the relationships that are to be observed between the diameter "a" of the wear-protection element 20, the diameter "b" of the tubes 7, the distance "c" of the wear-protection element 20 from the upper tube section 8, and the distance "d" between two tube sections 8.

In FIG. 3, in a gas conduit 21 having a bottom wall 22, a top wall 23, and side walls 24, heat-transfer surfaces 27, 28, and 29 are held via support fins or arms 30 on supporting tubes 25 and 26 that are cooled with a coolant K. Associated with the linear tube sections 8 of the heat-transfer surfaces 27 are wear-protection elements 20 that are disposed on support arms 30 of the supporting tubes 25 in such a way that, as shown in FIG. 4, the wear-protection elements 20 can be turned o withdrawn through the side wall 24 from the outside, and can be replaced.

The embodiment illustrated in FIG. 6 differs from that of FIG. 3 only in that the flow enters from above, the supporting tubes 31 extend parallel to the gas flow, and, to increase the protection against wear, two wear-protection elements 20 are disposed upstream of the heat-transfer tubes or surfaces.

Figure 8:
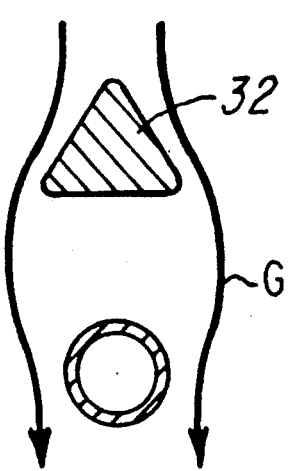

A circular profile for the wear-protection elements 20 as illustrated in FIGS. 3 to 7 has the advantage that due to the cross-sectional configuration, all grades of such elements are commercially available, especially with regard to corrosion. A further advantage is that after wear has occurred in one position, such wear-protection elements 20 can be rotated into a different position before they have to be withdrawn; in other words, a longer operating time can be obtained. The wear-protection element 32 shown in FIG. 8 has a triangular cross-sectional configuration and in the operating position is disposed in such a way that one of the points of the triangle is directed against the flow of gas. With an equilateral triangle, the advantage is achieved that at the surfaces, due to the angle of inflow, a sort of shearing wear is established that is considerably less than the wear that occurs at an angle of between 30° and 40°.

Figure 9:
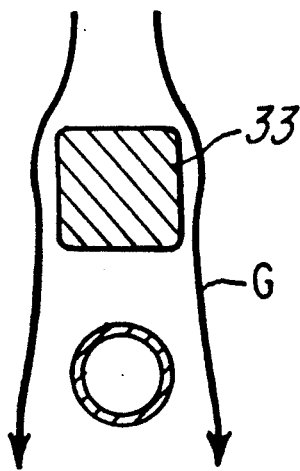

The wear-protection element 33 shown in FIG. 9 has a square cross-sectional configuration. With regard to wear, this cross-sectional configuration has the following advantage. The upper side is subjected to an impact or rebound wear, which is considerably less than the shearing wear, and the sidewalls are subjected to a very slight shearing wear.

The selection of various cross-sectional configurations for the wear-protection elements leads to an optimum condition taking into consideration the permissible pressure loss.

Where the fins 12, 13 and/or the wear-protection elements have a solid section or form, it is possible for them to be made entirely of a wear-resistant material, or they can have a less wear-resistant core that is coated with an erosion-resistant material.

FIGS. 3, 4, and 6 illustrate meandering heat-transfer surfaces 6, 27, 28, and 29, with the planes of meandering extending parallel to the supporting tubes. However, it is also possible for the planes of meandering to extend at right angles to the supporting tubes.

In the embodiment illustrated in FIG. 4, the ends of the wear-protection elements 20 extend through the conduit wall in order to make it possible to insert or remove these elements.

As illustrated in FIG. 1, the deflector 10 and wear-protection elements 20, 32, 33 can also be used together; however, this is not absolutely necessary for dust-laden gases.

Figure 10:
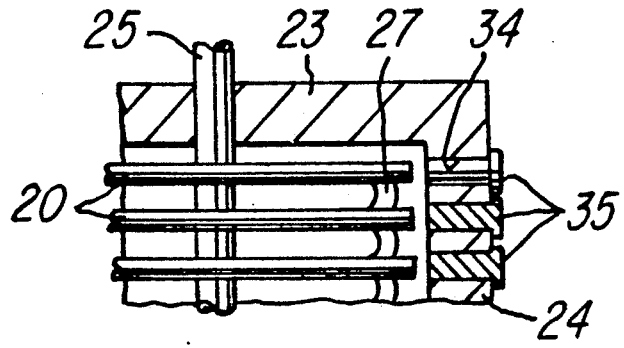
FIG. 10 shows an embodiment where the wear-protection elements extend only in the conduit.

FIG. 10 shows another possibility. In this embodiment, the wear-protection elements 20 do not extend through the wall 24. In coordination with the position of the wear-resistant elements, openings 34 are provided in the wall that can be closed off by removable plugs 35. After these plugs have been removed, the wear-protection elements can be withdrawn through the opening 34 by means of a tool, for example via a threaded engagement, after the tool has been positioned through the opening 34. If a cooperating opening is present in the opposite wall, it would also be possible to push the wear-protection element out through the cooperating opening by means of a rod-like tool that is inserted into the opening 34. Such an arrangement could also be used in conjunction with the deflector 10 if the deflector is not cooled.

The present invention is, of course, in no way restricted to the specific disclosure of the specification and drawings, but also encompasses any modifications within the scope of the appended claims.

What we claim is:

1. An arrangement protecting tube sections of platen-like heat-transfer surfaces in a gas conduit against wear from gases laden with solid particles, comprising:

elongated tube sections that form part of said platen-like heat-transfer surfaces; and wear protection element means having a lengthwise dimension and including, for a given elongated tube section that is to be protected, at least one wear-protection element that extends parallel to said tube section and while covering same is spaced upstream therefrom as viewed in the direction of a flow of gas through said gas conduit whereby particles are deflected through said tube sections so as to substantially avoid contact therewith, with said wear-protection element means being nonfixedly disposed in said gas conduit in such a way that it can be withdrawn therefrom, in the direction of said lengthwise dimensions thereof, with the distance of each wear-protection element from its tube section that is to be protected being less than or equal to the distance between adjacent elongated tube sections of said heat-transfer surface.

2. An arrangement according to claim 1, in which each of said wear-protection elements has a solid form.

3. An arrangement according to claim 2, in which each of said wear-protection elements has a circular cross-sectional configuration.

4. An arrangement according to claim 2, in which each of said wear-protection elements has a triangular cross-sectional configuration.

5. An arrangement according to claim 2, in which each of said wear-protection elements has a square cross-sectional configuration.

* * * * *